United States Patent [19]

Sarin et al.

[11] Patent Number: 4,497,228

[45] Date of Patent: Feb. 5, 1985

[54] METHOD OF MACHINING CAST IRON

[75] Inventors: Vinod K. Sarin, Lexington, Mass.; Robert A. Penty, Cape Elizabeth, Me.; Sergej-Tomislav Buljan, Acton, Mass.

[73] Assignee: GTE Laboratories Incorporated, Waltham, Mass.

[21] Appl. No.: 506,481

[22] Filed: Jun. 21, 1983

Related U.S. Application Data

[62] Division of Ser. No. 353,311, Mar. 1, 1982, Pat. No. 4,433,979.

[51] Int. Cl.$^3$ .................. B23B 1/00; B23B 27/14
[52] U.S. Cl. ........................... 82/1 C; 51/307; 407/119
[58] Field of Search ............... 82/1 R, 1 C; 407/119; 51/307, 309

[56] References Cited

U.S. PATENT DOCUMENTS

| | | | |
|---|---|---|---|
| 4,073,845 | 2/1978 | Buljan et al. | 264/65 |
| 4,106,616 | 7/1978 | Buljan | 206/233 |
| 4,145,224 | 3/1979 | Mehalchick et al. | 501/97 |
| 4,179,301 | 12/1979 | Buljan | 50/97 |
| 4,227,842 | 10/1980 | Samanta et al. | 409/131 |
| 4,286,905 | 9/1981 | Samanta | 409/132 |
| 4,320,203 | 3/1982 | Brandt et al. | 51/309 |
| 4,323,325 | 4/1982 | Samanta et al. | 51/309 |
| 4,352,308 | 10/1982 | Samanta et al. | 82/1 C |

OTHER PUBLICATIONS

"Optimization of the Properties of a Tool Material Based on Silicon Nitride", *Soviet Powder Metallurgy and Metal Ceramics*, 17:124–127, (1978).

*Primary Examiner*—Leonidas Vlachos
*Assistant Examiner*—Jerry Kearns
*Attorney, Agent, or Firm*—Ivan L. Ericson

[57] ABSTRACT

A composite article and cutting tool are prepared by densification to form a body consisting essentially of particles of hard refractory material uniformly distributed in a matrix consisting essentially of a first phase and a second phase, said first phase consisting essentially of crystalline silicon nitride and said second phase being an intergranular refractory phase comprising silicon nitride and a suitable densification aid selected from the group consisting of yttrium oxide, zirconium oxide, hafnium oxide and the lanthanade rare earth oxides and mixture thereof.

2 Claims, 3 Drawing Figures

4,497,228

METHOD OF MACHINING CAST IRON

This is a division of application Ser. No. 353,311, filed Mar. 1, 1982 now U.S. Pat. No. 4,433,979.

BACKGROUND OF THE INVENTION

This invention relates to abrasion resistant materials and to articles of manufacture made therefrom. More particularly, it is concerned with abrasion resistant materials comprising a hard refractory material distributed in a matrix containing silicon nitride, and with articles made therefrom.

An article, Soviet Powder Metallurgy and Metal Ceramics, pages 124-7, which is a translation from Poroshkovaya Metallurgiya, No. 2 (182), pp. 48-52, February, 1978 describes the preparation of dense nonporous silicon nitride blanks used for cutting tools from alumina, silicon nitride and titanium carbide.

U.S. Pat. No. 4,184,882 to Lange relates to a composite material formed from sintering and densification of a mixture of silicon nitride, silicon carbide and a densification aid.

SUMMARY OF THE INVENTION

In accordance with the present invention, there is provided a composite article of manufacture consisting essentially of particles of refractory material distributed in a matrix, said matrix consisting essentially of a first phase of silicon nitride and a refractory second phase comprising silicon nitride and an effective amount of a densification aid selected from the group consisting yttrium oxide, zirconium oxide, hafnium oxide and the lanthanide rare earth oxides and mixtures thereof. The articles possess properties of high abrasion resistance, high hardness, resistance to oxidation, and high fracture strength.

In accordance with other aspects of the present invention, there are provided cutting tools, a powder mixture, a process for making the articles of the present invention from the powder mixture.

For a better understanding of the present invention, together with other and further objects, advantages and capabilities thereof, reference is made to the following disclosure and appended claims in connection the abovedescribed drawing.

DETAILED DESCRIPTION

Figure 1:
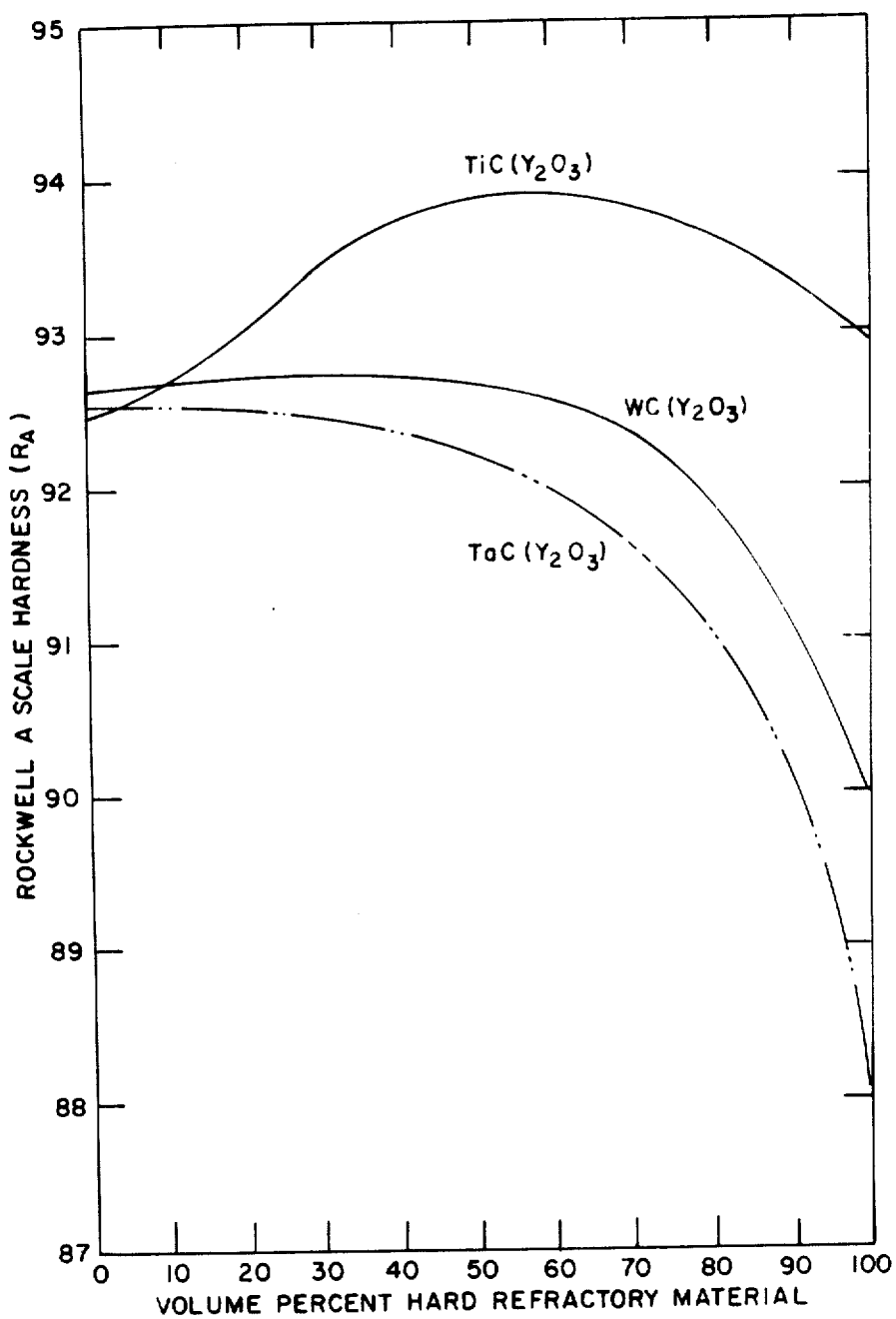
FIG. 1 is a graph illustrating the variation of hardness with variation of refractory material content of articles in accordance with this invention.

Abrasion resistant articles according to the present invention comprise finely divided particles of a hard refractory material dispersed in a matrix. By the term hard refractory material, as used throughout this specification and appended claims, is meant any carbide or nitride of a refractory metal. The refractory material has a microhardness greater than 100 kg/mm$^2$ and a fusion or decomposition temperature greater than 1500° C. Typical hard refractory materials include the carbides and nitrides, or combinations including solid solutions thereof of titanium, vanadium, chromium, zirconium, niobium, molybdenum, hafnium, tantalum, tungsten and mixtures thereof. FIG. 1 is illustrative of hardness for articles of the present invention prepared with titanium carbide, tungsten carbide and tantalum carbide based on volume percent of hard refractory material; titanium carbide and hafnium carbide are the most preferred hard refractory materials.

The average particle size of the hard refractory material incorporated into articles in accordance with this invention is chosen dependent upon the use to which the article is put, but ranges below about 20 microns. For example, for cutting tool applications, the average particle size is chosen near the lower end of the range, preferably below about 5 microns. On the other hand, for mining tools and wear parts average particle sizes above 5 microns may be used.

The useful life and performance of articles in accordance with this invention depends, in large part, on the volume taken up by the particles of hard refractory material in the article. The hard refractory material should comprise from about 1% to about 60% by volume of the densified article. As discussed further below, the hardness of the articles decreases at concentrations of refractory material in excess of 60% by volume. The preferred range of refractory material content is from about 15% to about 50% by volume. A more preferred range is from about 20 to about 40 volume percent.

In accordance with the principles of the present invention, the hard refractory materials are uniformly distributed in a matrix consisting essentially of a first phase and second phase. The first phase consists essentially of silicon nitride. The second intergranular phase or secondary phase comprises silicon nitride and an effective amount of a densification aid.

For optimizing the desirable properties, particularily high temperature strength of the composite of the present invention, it is preferable to maximize the high temperature stability of the secondary intergranular phase and maximize the density of the final densified composites. While the densification aid is essential to achieve highest densities, that is, densities approaching theoretical, improper composition of the second phase can deleteriously affect maximum attainable high temperature strength and creep resistance. The densification aids of the present invention stabilize the secondary phase to such an extent that the secondary phase is a refractory phase having desirable high temperature properties. Typical densification aids are yttrium oxide, zirconium oxide, hafnium oxide and the lanthanide rare earth oxides and mixtures thereof. Yttrium oxide and hafnium oxide are preferred densification aids. The densification aid is employed from a lower effective amount which permits high theoretical densities to an upper amount which does not unduly effect the high temperature properties. Preferably the densification aid comprises from about 1 to about 25 weight percent of the matrix. More preferably, from about 1 to about 5 weight percent of the matrix.

For optimizing the desirable high temperature properties of the composite of the present invention, it is desirable to minimize the presence of any additive such as aluminum oxide, at least to the extent that the favorable desirable high temperature properties of the final article are unfavorably effected by alteration of the secondary phase. Preferably aluminum oxide is present in the matrix material in an amount less than about 5 percent by weight based on the total weight of the matrix material, more preferably less than about 3 percent.

The secondary intergranular phase may contain further additional materials in the form of additives and impurities in addition to the hereinbefore mentioned densification aids and additives such as aluminum oxide. Such further additional materials may contribute to the desirable final properties. Such further additional materials are preferably present in an amount less than about 5 percent by weight based on the weight of the secondary phase. It is contemplated that silicon oxide may be a desirable additive. In case of silicon nitride bodies having a crystalline silicon nitride phase and a secondary phase, it has been found that silicon oxide present in a effective amount enables optimization of oxidation resistance in such bodies, see U.S. Ser. No. 944,515 filed Sept. 20, 1978, entitled "Oxidation Resistant Silicon Nitride Containing Rare Earth Oxide" by Thomas Smith.

Impurities may be present in the starting powder used for the manufacture of the composite of the present invention. These impurities tend to become concentrated in the intergranular phase during preparation of the composite. Preferably the purity of the starting powder is high, having less than about 0.1 weight percent cation impurities. A typical undesirable impurity is calcium which tends to deleteriously affect the secondary phase and high temperature properties.

The materials described herein have a composite microstructure of a refractory material, $Si_3N_4$ grains, and a secondary intergranular phase comprising silicon nitride and the densifiying additive. As hereinbefore mentioned, impurities and additives present in the body tend to concentrate in the secondary intergranular phase. Because the secondary intergranular phase is continuous, its characteristics profoundly affect the high temperature properties of the composite material. The composite of the present invention possess high strength at temperatures in excess of 1200° C., preferably in excess of 1500° C.

In accordance with the invention, a method is provided for facilitating sintering composite to densities approaching theoretical density while maintaining optimum levels of mechanical strength at both room temperature and elevated temperature, making them particularly useful in applications such as cutting tools.

In accordance with the principles of the present invention, the starting powder composition consists essentially of from about 25% to about 95% by weight of a silicon nitride powder, from about 1% to about 10% by weight of a powdered densification aid, and from about 5 to about 40 percent by weight refractory material powder. Additional ingredients are preferably present in the starting powder in amounts less than 5 percent by weight based on total weight of the starting powder.

The hard refractory particulate is dispersed in a matrix which is compacted to a high density by sintering or hot pressing techniques. A composition for the production of abrasion resistant materials according to the present invention may be made by employing $Si_3N_4$ powder, generally of particle size below about 3 microns, which is preferably either partly crystallized amorphous material or a mixture of substantially completely amorphous and substantially completely crystalline material. The crystalline $Si_3N_4$ which may be either the alpha or the beta polymorph or a mixture of these is preferably present in the amount of from 5% to 60% by weight of the total amount of $Si_3N_4$ powder, the remainder being substantially amorphous. Silicon nitride ceramics produced from such starting materials exhibit good to excellent densities and modulus of rupture values, as well as acceptable shrinkage values of the powder compacts during sintering.

The percent crystallinity of the starting material, if unknown, may be determined either by x-ray diffraction techniques, in which the intensity of the diffraction peaks of crystalline material is compared to a standard, or by infrared spectroscopy, in which the relative intensities of the broad absorption peak of the amorphous material and the narrow peaks of the crystalline material are compared.

Densification of the silicon nitride and refractory material is aided by the incorporation of the densification aid into the initial composition. In the initial powder compositions employed in the fabrication, the densification aid comprises initially from about 1% to about 10% by weight of the powder composition. Following densification of this powder composition to a highly densified product, the refractory metal carbide comprises from about 1% to about 60% of the total volume of the densified article as set out above. In the densified article, the balance of the article comprises the matrix of polycrystalline silicon nitride and the densification aid. In this densified article, the densification aid makes up from about 1% to about 25% by weight of the host matrix. The starting materials may be processed to a powder compact of adequate green strength by thoroughly mixing the starting materials by processes such as ball milling in a nonreactive liquid medium, such as toluene or methanol, and consolidating the mixture by pressing, extruding, or slip casting. Processing may also optionally include a presintering or prereacting step in which either the uncompacted powder or the powder compact is heated at moderate temperatures. Details of the fabrication of articles in accordance with this invention are given below in Methods I and II.

The host matrix comprises a two phase system made up of a first phase silicon nitride grains and a secondary phase including the densification aid. The particles of hard refractory material are uniformly dispersed throughout this matrix. Since the strength of articles in accordance with this invention decreases with increasing porosity in the total compact, it is important that the compact be sintered or pressed to a density as nearly approaching 100% theoretical density as possible. By theoretical is meant the value obtained by a weighted average of the densities of the components of the compact. As can be seen from the data in the Table below, densities approaching 100% of theoretical have been achieved for compacts containing yttrium oxide. Particular resistance to oxidation is conferred upon abrasion resistant articles of this invention by preferred densification aids. Yttrium oxide and hafnium oxide are preferred densification aids.

The porosity of articles of this invention is extremely low as indicated by the high theoretical density values given in the Table. The resulting strength of such articles is greater than that of silicon nitride based articles obtained by nitriding techniques or reaction bonding methods. The density of such articles is generally of the order of about 80% of theoretical.

Densified ceramic articles made in accordance with this invention are hard, nonporous, abrasion resistant, and resistant to oxidation. Applications of these articles include, but are not limited to cutting tools, mining tools, stamping and deep-drawing tools, extrusion dies, wire and tube drawing dies, nozzles, guides, bearings, and wearresistant, and structural parts.

As demonstrated by the Examples given below, hard abrasion resistant cutting tools having improved resistance to oxidation can be fabricated in accordance with this invention by distributing particles of a hard refractory material in a matrix comprising polycrystalline silicon nitride and a densification aid.

To enable one skilled in the art to practice this invention, the following Examples are provided. These Examples are, however, not to be viewed as limiting the scope of the invention as claimed, but are intended only to be illustrative thereof. The materials of Examples I–VI below have been prepared by hot pressing or sintering techniques detailed in Methods I and II below.

Methods I and II illustrate methods of preparing abrasion resistant silicon nitride based materials in accordance with this invention. In one method, pressed green compacts containing silicon nitride, a particulate hard refractory material and a sintering or densification aid are sintered to a dense, polycrystalline product. In a second method, dry powdered mixtures of silicon nitride, a particulate hard refractory material, and a densification aid are hot pressed to produce a shaped article comprising a polycrystalline highly densified product.

METHOD I

To one part of a mixture of silicon nitride, hard refractory material, and densification aid are added about 2.5 parts by weight toluene, about 0.1 parts methanol, and about 0.05 parts stearic acid. The resulting slurry is thoroughly mixed by ball milling and then dried at 105° C. The resulting dry mixture is ball milled for about 24 hours and then mixed with about 0.05 parts by weight of polyethylene glycol-methoxy polyethylene glycol copolymer, 1 part toluene and about 0.05 parts methanol. This mixture is ball milled for about 15 minutes, dried at 105° C. and then screened through a 60 mesh screen. The −60 mesh fraction is pressed at about 25,000 psi to obtain a green compact. The residual solvents and binders in the green compact are removed by heating at 600° C. in an inert atmosphere. The green compact is then sintered to a hard, highly densified product by heating to temperatures of 1700°–1850° C.

METHOD II

To one part of a mixture of silicon nitride, hard refractory material, and densification aid are added about 2.5 parts by weight toluene and about 0.1 parts methanol. The resulting slurry is thoroughly mixed by ball milling and then dried at 105° C. The dry mixture is ball milled for about 24 hours and then screened through a 60 mesh screen. The −60 mesh fraction is pressed at about 3000 psi and about 1700° C. to produce a hard, highly densified product.

Examples I–VI illustrate the incorporation in the host matrix of silicon nitride and densification aid a hard particulate refractory metal carbide at a variety of concentrations.

The hardness of the materials prepared in Examples I–VI was determined on a metallographically polished surface of each sample by the indentation hardness test using the Rockwell A-scale ($R_A$). The hardness data for Examples I–VI given in Table 1 and for the carbides of titanium, tungsten and tantalum are plotted in FIG. 1 versus volume percent hard refractory material in the densified composite. As can be seen there, the hardness of materials in accordance with the present invention which incorporate a hard refractory in a silicon nitride matrix is greater than that of the intrinsic hardness of the refractory material in each case illustrated. In the particular case of silicon nitride containing titanium carbide, the hardness values of the densified compacts are greater than either sintered silicon nitride itself or titanium carbide itself. Moreover in every example illustrated in FIG. 1, the hardness of the various mixtures of refractory carbide and silicon nitride is greater than would be expected for each mixture estimated on the basis of a simple law of combination. Thus, the hardness of the densified composite is greater than the fractional weight of silicon nitride in the composite times the hardness of silicon nitride plus the fractional weight of metal carbide times the hardness of the refractory material.

The plot of hardness data in FIG. 1 also illustrates a marked decrease in hardness with increasing refractory material content above about 60 volume percent. This is attributed to the decreasing ability of the silicon nitride matrix to cement the particles of hard refractory as the volume occupied by those particles exceeds 60% of the volume of the total densified compact.

Since many of the metallic carbides usually employed in the production of tool articles are known to be susceptible to oxidation, the resistance to oxidation of silicon nitride based abrasion resistant materials in accordance with the present invention was evaluated for several samples. For example, appreciable oxidation of titanium carbide has been reported to occur at temperatures as low as 427° C.

The materials of Example IV which contain titanium carbide, and whose composition is given above in the Table was heated in air at 1200° C. and the oxide weight gain was recorded as $kg/m^2$ of surface area. For comparison, a prior art TiC-Ni-Mo cemented carbide material was similarly heated, but at 1000° C. The data from these tests are plotted in FIG. 2.

Figure 2:
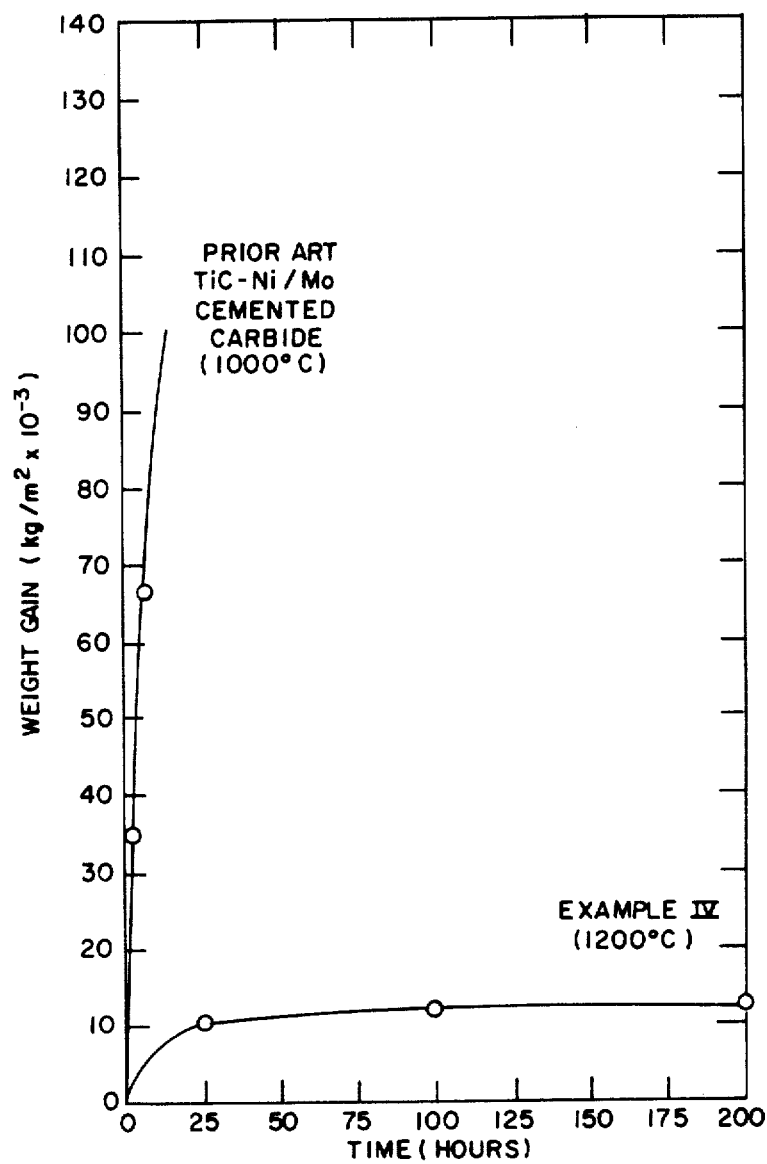
FIG. 2 is a graph comparing oxidation resistance of a prior art material to that of articles of the present invention.

Examination of the data appearing in FIG. 2 shows an appreciable reduction in the oxidation rate of materials of the present invention in which titanium carbide is included in a silicon nitride matrix over that of known materials in which titanium carbide is cemented in a metallic matrix. The low oxidation rate of Example IV is attributed to the use of yttrium oxide as the densification aid in Example IV which confers oxidation resistance upon silicon nitride based abrasive materials in which it is employed. Yttrium oxide is thus a preferred densification aid for silicon nitride based abrasion resistant materials in accordance with this invention when in applications requiring oxidation resistance.

The wear resistance of abrasion resistant materials in accordance with this invention was evaluated for several samples under high speed lathe cutting conditions.

A bar of gray cast iron was turned on a lathe using a prior art WC-Co cemented carbide tool and tools fabricated of material in accordance with this invention containing titanium carbide. The effective turning speed was 1000 surface feet per minute (SFM). The lathe was operated to effect a cut depth by the tool of 0.050 inches, with the tool moving across the face of the workpiece at a rate of 0.020 inches per revolution (IPR).

Figure 3:
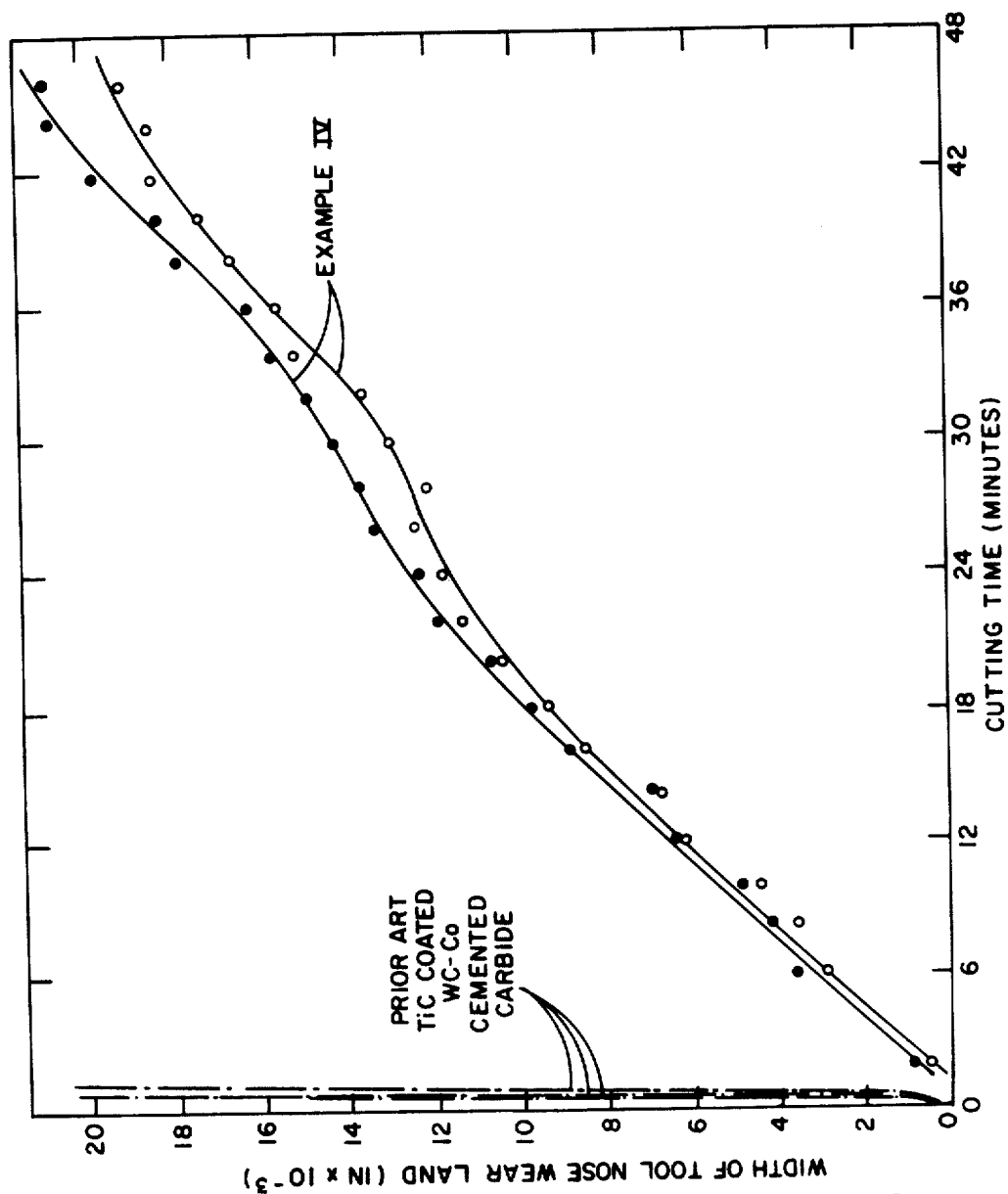
FIG. 3 is a graph illustrating wear resistance of cutting tools in accordance with this invention.

In FIG. 3, the machinability of cutting tools in accordance with this invention, is compared with that of prior art TiC coated WC-Co cemented carbide tools.

As shown there, tools fabricated of material having the composition of Example IV demonstrated much longer useful life than the prior art cemented carbide tools under the stringent cutting conditions imposed, as detailed above.

There is thus provided by the present invention improved abrasion resistant materials having high hardness, improved wear resistance, and increased resistance to oxidation. While there have been shown what are at present considered to be the preferred embodiments of the invention, it will be obvious to those skilled in the art that various changes and modifications may be made therein without departing from the scope of the invention as defined by the appended claims.

TABLE

| EX. | DENSIFICA-TION AID | REFRACTORY MATERIAL | PERCENTAGES OF COMPOSITION* | | | | | | PERCENT THEORETICAL DENSITY | HARDNESS (ROCKWELL A SCALE) |
|---|---|---|---|---|---|---|---|---|---|---|
| | | | SILICON NITRIDE** | | DENSIFICATION AID** | | REFRACTORY MATERIAL*** | | | |
| I | $Y_2O_3$ | TiC | 80.5 | (94.0) | 5.1 | (6.0) | 14.4 | (10.9) | 100 | 92.6 |
| II | $Y_2O_3$ | TiC | 57.0 | (94.0) | 3.6 | (6.0) | 39.4 | (32.6) | 100 | 93.4 |
| III | $Y_2O_3$ | TiC | 37.4 | (94.0) | 2.4 | (6.0) | 60.2 | (53.4) | 100 | 93.7 |
| IV | $Y_2O_3$ | TiC | 64.0 | (91.4) | 6.0 | (8.6) | 30.0 | (24.2) | 100 | 93.76 |
| V | $Y_2O_3$ | TaC | 32.1 | (94.1) | 2.0 | (5.9) | 65.9 | (49.1) | 100 | 91.5 |
| VI | $Y_2O_3$ | WC | 30.7 | (93.9) | 2.0 | (6.1) | 67.3 | (50.4) | 100 | 92.7 |

*Percentage figures not enclosed in parentheses are percentages by weight of each component based upon the weight of the total mixture.
**Percentage figures for silicon nitride and densification aid enclosed in parentheses are percentages by weight of each component upon the weight of the silicon nitride-densification aid host matrix.
***Percentage figures for the refractory material enclosed in parentheses are percentages by volume based upon volume of the total densified compact.

We claim:

1. A method of machining cast iron comprising
turning a cast iron work piece on a lathe at an effective speed of up to 1000 surface feet per minute;
moving a densified composite ceramic cutting tool consisting essentially of particles of hard refractory material uniformly distributed in a two phase matrix, said two phase matrix consisting essentially of a first phase and a second intergranular phase, said particles of hard refractory material being present in an amount from about 1 to about 60 volume percent of said densified composite ceramic cutting tool, said particles of hard refractory material selected from the group consisting of the carbides, nitrides, and mixtures thereof of titanium, vanadium, chromium, zirconium, niobium, molybdenum, hafnium, tantalum, tungsten, and combinations thereof, said particles having an average size of less than about 20 microns, said first phase consisting essentially of crystalline silicon nitride, said second intergranular phase consisting essentially of silicon nitride and a densification aid, said densification aid selected from the group consisting of yttrium oxide, hafnium oxide, the lanthanide rare earth oxides, and mixtures thereof, wherein said densification aid comprises from about 1 to about 25 weight percent of said two phase matrix, said two phase matrix containing less than 3 weight percent aluminum oxide, said densified composite ceramic article having a high density, a high abrasion resistance, a high hardness, a high fracture strength and a resistance to oxidation at temperatures greater than 1200° C. across the face of said cast iron workpiece at a rate of up to 0.020 inches per revolution; and
cutting said cast iron workpiece with said densified composite ceramic cutting tool to effect a depth of cut of up to 0.050 inches per pass.

2. A method of machining cast iron comprising
turning a cast iron work piece on a lathe at an effective speed of up to 1000 surface feet per minute;
moving a densified composite ceramic cutting tool consisting essentially of particles of hard refractory material uniformly distributed in a two phase matrix, said two phase matrix consisting essentially of a first phase and a second intergranular phase, said particles of hard refractory material being present in an amount from about 1 to about 60 volume percent of said densified composite ceramic cutting tool, said particles of hard refractory material selected from the group consisting of the carbides, nitrides, and mixtures thereof of titanium, vanadium, chromium, zirconium, niobium, molybdenum, hafnium, tantalum, tungsten, and combinations thereof, said particles having an average size of less than about 20 microns, said first phase consisting essentially of crystalline silicon nitride, said second intergranular phase consisting essentially of silicon nitride and a densification aid, said densification aid selected from the group consisting of yttrium oxide, hafnium oxide, the lanthanide rare earth oxides, and mixtures thereof, wherein said densification aid comprises from about 1 to about 25 weight percent of said two phase matrix, said two phase matrix containing less than 3 weight percent aluminum oxide, said densified composite ceramic article having a high density, a high abrasion resistance, a high hardness, a high fracture strength and a resistance to oxidation at temperatures greater than 1200° C. across the face of said cast iron workpiece at a rate of about 0.020 inches per revolution; and
cutting said cast iron workpiece with said densified composite ceramic cutting tool to effect a depth of cut of about 0.050 inches per pass and a cutting time up to about 46 minutes.

* * * * *